US012792656B2

(12) United States Patent
Olmez et al.

(10) Patent No.: US 12,792,656 B2
(45) Date of Patent: Nov. 10, 2026

(54) PARALLEL COMPUTING CATEGORISATION PROCESS

(71) Applicant: Fujitsu Limited, Kawasaki (JP)

(72) Inventors: Sedar Olmez, Slough (GB); Oluwatamilore Orojo, Slough (GB)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 19/078,946

(22) Filed: Mar. 13, 2025

(65) Prior Publication Data

US 2025/0307300 A1 Oct. 2, 2025

(30) Foreign Application Priority Data

Mar. 27, 2024 (EP) .................................... 24166709

(51) Int. Cl.
*G06F 16/353* (2025.01)
*G06F 16/358* (2025.01)
*G10L 15/26* (2006.01)

(52) U.S. Cl.
CPC .......... *G06F 16/353* (2019.01); *G06F 16/358* (2019.01); *G10L 15/26* (2013.01)

(58) Field of Classification Search
CPC .... G06F 16/353; G06F 16/358; G06F 40/284; G06F 40/30; G10L 15/26; G06N 20/00; G06Q 10/04; G06Q 10/10
See application file for complete search history.

(56) References Cited

U.S. PATENT DOCUMENTS

| | | | | |
|---|---|---|---|---|
| 2019/0042933 | A1 | 2/2019 | Powell et al. | |
| 2021/0350257 | A1* | 11/2021 | Colcord | G06N 5/04 |
| 2022/0171969 | A1* | 6/2022 | Guzik | G06V 20/41 |
| 2023/0186906 | A1* | 6/2023 | Gordon | G06F 40/30 704/254 |
| 2023/0206001 | A1* | 6/2023 | Srivastava | G06F 3/14 704/9 |
| 2023/0230613 | A1* | 7/2023 | Michaeli | G10L 25/03 704/270 |
| 2024/0089372 | A1 | 3/2024 | Kaniganti et al. | |

(Continued)

OTHER PUBLICATIONS

Extended European Search Report dated Sep. 10, 2024, issued in counterpart EP application No. 24166709.6. (8 pages).

(Continued)

*Primary Examiner* — Dangelino N Gortayo
(74) *Attorney, Agent, or Firm* — WHDA, LLP

(57) ABSTRACT

A computer-implemented method including: obtaining real-time text data relating to a matter, the text data comprising a plurality of portions of information; performing a categorisation process, wherein the categorisation process is configured to run a plurality of threads in parallel, wherein each thread of the plurality of threads acts on one portion of information at a time, wherein each thread performs the following steps: (i) obtaining a sentiment score based on the portion of information using a Sentiment Analysis machine learning, ML, model; (ii) assigning a category to the matter based on the sentiment score using a classification ML model trained on historical data; and (iii) updating a live category based on the category assigned to the matter; and finally, outputting the live category to a user in real-time.

19 Claims, 9 Drawing Sheets

(56) References Cited

U.S. PATENT DOCUMENTS

2024/0412048 A1* 12/2024 Knudson ................. G06F 40/40

OTHER PUBLICATIONS

Tiam-Lee, T.J., Henriques, R. and Manquinho, V., "Associative Analysis of Inefficiencies and Station Activity Levels in Emergency Response", 2022, ISPRS International Journal of Geo-Information, vol. 11, No. 7, p. 356. URL: <https://doi.org/10.3390/ijgi11070356.> (20 pages).

Cabral, E.L.D.S., et al., "Response time in the emergency services. Systematic review", 2018, Acta cirurgica brasileira, vol. 33, No. 12, pp. 1110-1121, URL: http://dx.doi.org/10.1590/s0102-865020180120000009. (12 pages).

Wennlund, K.T., et al., "Emergency medical dispatchers' experiences of managing emergency calls: a qualitative interview study", 2022, BMJ open, vol. 12, No. 4, p. e059803, URL: http://dx.doi.org/10.1136/bmjopen-2021-059803. (9 pages).

Narognsak, T., "Development of the Metropolitan Police Emergency Call System", 2018, International Journal of Crime, Law and Social Issues, vol. 5, No. 1, pp. 134-143. (10 pages).

Cannon, T.W., "Consolidation of law enforcement dispatch operations in Harris County Texas", 2013, The Bill Blackwood Law Enforcemnet Management Institute of Texas, pp. 1-22. (25 pages).

Mukhopadhyay, A., "A review of emergency incident prediction, resource allocation and dispatch models" 2020, arXiv preprint arXiv:2006.04200, pp. 1-24. (24 pages).

Schilit, B., Hong, J. and Gruteser, M., "Wireless location privacy protection" 2003, Invisible Computer, vol. 36, No. 12, pp. 135-137. (3 pages).

Curry, M.R., Phillips, D.J. and Regan, P.M., "Emergency response systems and the creeping legibility of people and Places", 2004, The Information Society, vol. 20, No. 5, pp. 357-369. (14 pages).

Mcnab, A.L., Hess, T.J. and Valacich, J.S., "Designing emergency response dispatch systems for better dispatcher Performance", 2011, AIS Transactions on Human-Computer Interaction, vol. 3, Issue 1, pp. 26-55, URL: https://aisel.aisnet.org/thci. (32 pages).

Dash, P., Neustaedter, C., Jones, B. and Yip, C., "The design and evaluation of emergency call taking user interfaces for next generation 9-1-1", 2022, Frontiers in Human Dynamics, vol. 4, p. 670647.URL: https://www.frontiersin.org. (20 pages).

Barros, O. and Echevers, F., "Emergency ambulance service design: Intelligent Triage automated support for medical Decisions", 2021, Research Gate, pp. 1-19, URL: https://www.researchgate.net/publication/349992577. (21 pages).

Sdongos, E., et al., "Next generation automated emergency calls", 2017, IEEE CCNC (Globe-IoT, 2017) Las Vegas, Nevada, USA, pp. 1-6. (6 pages).

Arbib, C., et al., "Real-time emergency response through performant IoT architectures", May 2019, In International Conference on Information Systems for Crisis Response and Management (ISCRAM), pp. 388-401. (14 pages).

Kong, W., Lei, Y. and Ma, J., "Data security and privacy information challenges in cloud computing", 2016, IEEE, International Journal of Computational Science and Engineering, vol. 16, No. 3, pp. 215-218. (3 pages).

Khadam, U., et al., "Text data security and privacy in the internet of things: threats, challenges, and future directions", 2020, Wireless Communications and Mobile Computing, pp. 1-15. URL: <https://doi.org/10.1155/2020/7105625.> (15 pages).

Møller, T.P., et al., "Why and when citizens call for emergency help: an observational study of 211,193 medical emergency calls", 2015, Scandinavian journal of trauma, resuscitation and emergency medicine, vol. 23, pp. 1-10. (10 pages).

Snooks, H.A., et al., "What are emergency ambulance services doing to meet the needs of people who call frequently? A national survey of current practice in the United Kingdom", 2019, BMC Emergency Medicine, vol. 19, No. 1, pp. 1-8, URL: < https://doi.org/10.1186/s12873-019-0297-3.> (8 pages).

Wade, N.T. and Macpherson, A., "Call Taking Basics for Emergency Services-Police Communications", 2016, Kwantlen Polytechnic University, pp. 1-173, URL: http://kora.kpu.ca/facultypub. (181 pages).

Booker, M.J., Simmonds, R.L. and Purdy, S., "Patients who call emergency ambulances for primary care problems: a qualitative study of the decision-making process", 2014, Emergency Medicine Journal, vol. 31, No. 6, pp. 448-452. URL: http://emj.bmj.com. (5 pages).

Rowe, R., "A multi-methodological approach to emergency call handling in the Metropolitan Police Service", 2002, In Systems Theory and Practice in the Knowledge Age, Boston, MA: Springer US, pp. 79-86. (2 pages).

Kirby, K., Voss, S., Bird, E. and Benger, J., "Features of Emergency Medical System calls that facilitate or inhibit Emergency Medical Dispatcher recognition that a patient is in, or at imminent risk of, cardiac arrest: A systematic mixed studies review" 2021, Resuscitation plus, vol. 8, p. 100173. (11 pages).

Hayashi, R., "Categorization for occasioned semantics: Reanalysis of a Japanese Yamagata 119 emergency call", 2019, Discourse Studies, vol. 21, No. 5, pp. 495-521. (27 pages).

Victor, C.R., et al., "Who calls 999 and why? A survey of the emergency workload of the London Ambulance Service", 1999, Emergency Medicine Journal, vol. 16, No. 3, pp. 174-178. (5 pages).

Trujillo, A., Orellana, M. and Acosta, M.I., "Design of emergency call record support system applying natural language processing techniques", Nov. 2019, In Conference on Information Technologies and Communication of Ecuador, Cham: Springer International Publishing. (Abstract), pp. 53-65. (5 pages).

Young, V., Rochon, E. and Mihailidis, A., "Exploratory analysis of real personal emergency response call conversations: considerations for personal emergency response spoken dialogue systems", 2016, Journal of NeuroEngineering and Rehabilitation, vol. 13, No. 1, pp. 1-26. (26 pages).

* cited by examiner

100

PARALLEL COMPUTING CATEGORISATION PROCESS

TECHNICAL FIELD

Embodiments of the present invention described herein relate to a parallel computing categorisation process, and in particular to a computer-implemented method, a computer program and an information processing apparatus.

BACKGROUND

Categorizing matters based on calls and/or messages is crucial for efficient communication management across various domains. For example, in customer service, categorisation helps streamline inquiries, ensuring they reach the appropriate department or personnel swiftly. By labelling calls based on the nature of the inquiry, companies can prioritize and allocate resources effectively, resulting in improved customer satisfaction and resolution times. In another example, emergency calls are often categorized by severity to prioritize response and allocate resources effectively. The exact categorisation system can vary depending on the emergency response organization and the country, but generally, severity levels are assigned based on the perceived urgency and potential threat to life or property. Emergency dispatchers or call-takers often use protocols and guidelines provided by their organization to assess the severity of each call and assign an appropriate response level. They may ask specific questions to gather more information and make a rapid assessment of the situation. Overall, effective categorisation of matters based on calls and/or messages is essential for enhancing efficiency, responsiveness, and overall service quality across various industries and sectors.

Improved methods for categorisation are desirable.

SUMMARY OF THE DISCLOSURE

According to an embodiment there is disclosed herein a computer-implemented method comprising obtaining real-time text data relating to a matter, the text data comprising a plurality of portions of information; performing a categorisation process, wherein the categorisation process is configured to run a plurality of threads in parallel, wherein each thread of the plurality of threads acts on one portion of information at a time, wherein each thread performs the following steps: (i) obtaining a sentiment score based on the portion of information using a Sentiment Analysis machine learning, ML, model; (ii) assigning a category to the matter based on the sentiment score using a classification ML model trained on historical data; and (iii) updating a live category based on the category assigned to the matter; and outputting the live category to a user in real-time.

BRIEF DESCRIPTION OF THE DRAWINGS

Embodiments of the invention will now be further described by way of example only and with reference to the accompanying drawings, wherein.

DESCRIPTION OF THE EMBODIMENTS

Overview

Figure 1:
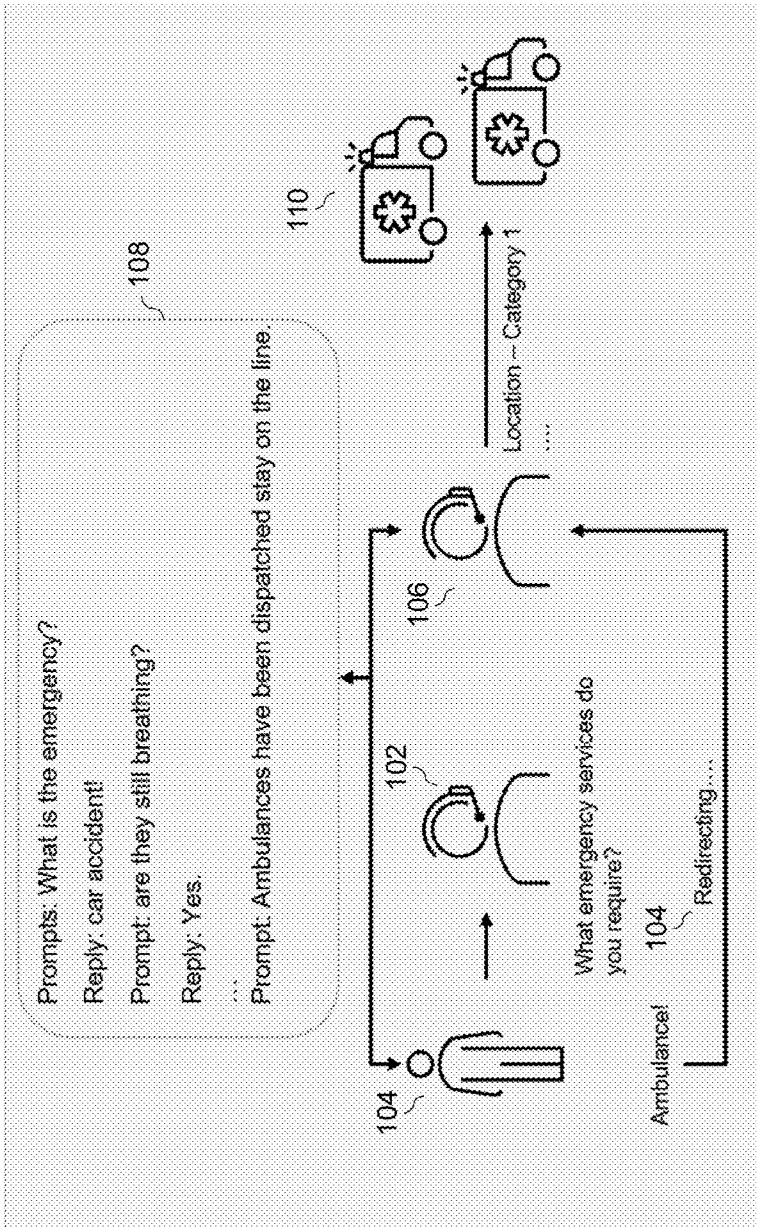
FIG. 1 illustrates prior art processes for emergency call categorisation.

Embodiments of the invention provide a Real-Time Automated Dynamic Event Categorisation (rt-ADEC) Framework using Parallel Language Processing which deals with event categorisation using a parallelised framework with several layers of supervised machine learning processes to assign a category to a matter. Embodiments of the invention categorise a matter (e.g. an event, an incident, a problem, a query, an inquiry) using historical data and classification-based algorithms on text-based data using a parallel computing pipeline. The category will be updated and may change as more information is acquired in real-time. One application of some embodiments of the invention is to support the management of emergency service's resources by providing a tool to support dispatchers for better need categorisation. The invention is described below primarily in relation to this application. However, embodiments of the invention focus on determining the importance and urgency of tasks based on historical data and real-time text data (which may be voice-to-text data), which can have applications in various domains beyond emergency services. Embodiments of the invention may equally be used for any industry or sector which benefits from categorising a matter based on incoming text data in real-time as the text data could relate to any matter, the categorisation could relate to any set of categories, and the historical data could relate to any context.

Categorizing calls and/or messages is important across various industries and sectors, including:

1. Customer Service: In businesses, categorisation is crucial for efficiently managing customer inquiries. By sorting calls and messages into categories based on topic and/or urgency, companies can ensure that each query is directed to the appropriate department or representative, resulting in quicker resolution times and improved customer satisfaction.
2. Emergency Services: In emergency response systems, categorizing calls plays a critical role in prioritizing and dispatching resources effectively. Calls may be categorized based on severity or urgency or the type of emergency. This allows dispatchers to allocate appropriate personnel and equipment promptly to address situations.

3. Healthcare: In healthcare settings, categorizing patient calls and messages helps medical staff prioritize and address inquiries and concerns. Calls may be classified based on urgency, medical condition, or department, enabling healthcare providers to deliver timely and appropriate care.
4. Tech Support: In the tech industry, categorizing support calls and messages based on urgency, topic or issue allows support teams to efficiently troubleshoot and resolve problems. This classification ensures that specialized support personnel are assigned to handle specific types of technical issues, resulting in quicker resolution times and improved customer satisfaction.

Overall, categorizing matters based on calls and messages is important for optimizing communication management, improving response times, and ensuring efficient resource allocation across various sectors.

One example of a technical challenge at hand pertains to the conventional approach employed by emergency services for incoming call severity categorisation. This process typically involves manual steps where a call handler engages with a caller, uses verbal prompts to gather information, and then subjectively categorises the emergency call into various severity levels based on their own experience and training. This method falls short in several ways: it relies on limited and potentially biased information, introduces subjectivity into the categorisation process, and often leads to inefficient resource allocation which costs emergency services a substantial amount of money. As a result, incidents that may sound similar can be very different in nature, and the reliance on subjective judgments can result in over-allocation or under-allocation of resources. This challenge highlights the need for a more sophisticated and data-driven solution to optimise emergency call categorisation and resource allocation.

Embodiments of the present invention seek to address these challenges by introducing automation and advanced technologies, such as language processing algorithms, to enhance the accuracy of call categorisation. By moving away from subjective assessments and incorporating data-driven insights, this system aims to ensure that the most suitable resources are assigned to each emergency call, improving the overall efficiency and effectiveness of emergency services and ultimately enhancing public safety. When applied to categorising the severity of emergency events, embodiments of the invention provide more efficient categorisation which will optimise the call handling of emergency services and alleviate the mental pressures on call operators having to subjectively identify severities from verbal cues.

There are four areas where the technical challenges arise, these are described below in detail:

1. Outdated technology and cost constraints—the current technology infrastructure used by emergency services often relies on aging software and hardware systems. Upgrading to new technologies would be advantageous in improving efficiency and accuracy in emergency call categorisation. However, implementing these changes poses several challenges. Firstly, it requires substantial financial investment for both acquiring modern hardware and software solutions and training personnel to use them effectively. Emergency services typically operate under budget constraints, making it difficult to justify the significant upfront costs of such technological upgrades. Additionally, integrating new technologies while ensuring minimal disruption to ongoing emergency operations is a complex and delicate process.
2. Scalability for real—time call handling-handling a large volume of incoming emergency calls in real-time demands a highly scalable infrastructure. Emergency services must be prepared to handle spikes in call volume during crises or disasters. Achieving this scalability while maintaining low response times and efficient resource allocation is a significant technical challenge. It involves designing and implementing algorithms and systems that can dynamically allocate resources, prioritize calls, and ensure that response times remain within acceptable limits even during peak demand periods.
3. Advanced algorithms for call categorisation—developing accurate algorithms for categorising emergency calls based on urgency and severity requires advanced language processing and pattern recognition techniques. This challenge involves creating algorithms that can analyse the content of emergency calls, identify keywords or patterns indicative of severity, and assign appropriate priority levels. These algorithms must adapt to various languages, accents, and dialects, and they need to handle both structured and unstructured data effectively. Achieving high accuracy in a call categorisation is important for ensuring that the most urgent cases receive immediate attention.
4. Seamless integration, data privacy and security—implementing a new emergency categorisation system must seamlessly integrate with existing legacy systems used by emergency services. This integration is important to ensure a smooth transition and avoid disruptions in critical services. Moreover, maintaining robust data privacy and security measures is paramount when handling sensitive information during emergency calls. Protecting the confidentiality and integrity of caller data while facilitating effective categorisation poses a complex challenge. Additionally, establishing collaborative partnerships among multiple stakeholders, including government agencies, law enforcement, and healthcare providers, is important for ensuring a coordinated and efficient emergency response system, but it involves navigating complex regulatory and organisational landscapes.

Embodiments of the present invention, when applied to emergency call categorisation, address the above challenges by providing:

Scalability and flexibility—Modern advanced computing interfaces could provide emergency services with the capability to scale resources dynamically, ensuring efficient handling of high call volumes during peak times. This scalability is made possible through virtualization technologies, which abstract physical infrastructure and enable the rapid provisioning of virtual instances. Advanced computing databases further support the growing volume of call data and ensuring the data is accessible for training machine learning models. Additionally, global availability of data centres ensures redundancy and fault tolerance, enhancing the overall resilience of the system. These technical elements collectively empower emergency services to adapt to fluctuating call traffic efficiently and allocate resources effectively.

Automation and efficiency—automation in emergency call handling relies on advanced technologies such as language processing and machine learning. Language processing algorithms employ machine learning models, including neural networks, to process and understand emergency call content, both in audio and text form. Machine learning models are trained on historical call data, enabling the development of categorisation algorithms. These algorithms often based on supervised learning, classify calls into predefined categories based on urgency and severity. Additionally by incorporating parallel computing methods and big data analytics, real-time event categorisation is developed, which subsequently optimises resource usage and reduces response times across the emergency resource dispatch process.

Real-time processing and decision-making—real-time computing plays a pivotal role in improving emergency services' responsiveness. Real-time data processing methods can facilitate rapid information sharing and lead to location-based decision making in a timely manner. Real-time data streams enable instant updates and coordination between emergency services and call centres. Large data stream processing frameworks handle high data volumes in real-time, performing data enrichment, categorisation, and decision-making. A real-time data processing framework ensures that emergency services can process incoming calls swiftly and make informed, decisions quicker, overcoming the bottleneck of high call volumes.

Enhanced data security and privacy—maintaining the security and privacy of caller information is a paramount concern, especially with regards to legislative compliance. Technical measures typically include robust data encryption methods, such as SSL/TLS for data in transit and AES, DES or other forms of encryption for data at rest, guaranteeing the confidentiality and integrity of call data. Access control mechanisms, like Role-Based Access Control (RBAC) and Access Control Lists (ACLs), restrict access to authorised personnel, preventing unauthorised access or modification of call data. Secure data storage solutions implement techniques such as data marking, tokenisation, and anonymisation to protect sensitive information stored in databases or logs. These security measures align with compliance requirements of data privacy regulations, such as GDPR or HIPAA, necessitating stringent auditing, monitoring and data anonymisation practices. Overall, these technical elements collectively ensure the secure and compliant handling of caller information, instilling trust in emergency services.

The following non-exhaustive and exemplary list describes some technical terms:

(near-) Real-time: Refers to the capability of a computer system, process, or application to respond to events or input instantaneously or with minimal delay as they occur in the physical world.

Emergency Services: Refers to the organizations and agencies responsible for responding to emergencies, including situations that require medical, fire, or police assistance.

Public Safety Answering Point (PSAP): An emergency call centre responsible for receiving and processing emergency calls, determining the appropriate response, and dispatching the necessary resources.

Call Handler or Dispatcher: A trained professional at the PSAP who receives emergency calls, assesses the nature of the emergency, and gathers critical information from the caller.

Emergency Call Categorisation: The process of classifying emergency calls based on their perceived severity, ranging from life-threatening situations to non-urgent incidents.

Automated Speech Recognition (ASR): Technology that converts spoken language into written text, often used to transcribe emergency calls.

Natural Language Processing (NLP): A field of artificial intelligence that focuses on enabling computers to understand, interpret, and generate human language.

Parallel Computing: A type of computation in which many calculations or processes are carried out simultaneously, improving the efficiency and speed of data processing.

Caller Type: The classification of the person making the emergency call, such as a care provider or an older adult.

Risk Level: The assessment of the potential danger or severity associated with the emergency incident.

Conversational Measures: Metrics related to the content and structure of the conversation between the caller and the call handler, including the number of words, turn length, and/or words per minute.

Incident Resolution: The actions taken by emergency responders to address and mitigate the emergency situation, which may involve providing medical care, ensuring public safety, or other interventions.

Quality Assurance and Review: The process of evaluating and assessing the handling of each emergency call to ensure adherence to protocols and identify areas for improvement.

Patient Identifier: Information used to distinguish individuals who frequently or urgently require emergency services, often used in the context of healthcare-related emergencies.

Grading System: A method used by emergency services to assess the priority and severity of incidents, often based on factors such as time, location, and caller information.

Central Graded Response Manual: A set of guidelines and protocols used by emergency services to categorize and respond to incidents based on legislation and predefined criteria.

Emergency Medical Dispatcher: A specialized call handler responsible for assessing medical emergencies and providing instructions or dispatching medical resources.

Out-of-Hospital Cardiac Arrest: A medical emergency situation in which a person's heart stops beating while outside a healthcare facility, requiring immediate medical attention.

Asymmetric Nature of Discourse: Refers to the unequal distribution of conversational control and status between call-takers (dispatchers) and callers during emergency calls.

Colloquial Communication: Informal and everyday language used in everyday conversation, as opposed to formal or institutional discourse.

Institutional Discourse: The formal and structured language used by emergency call-takers and institutions when interacting with callers during emergency situations.

The following description is the typical process emergency services undertake to handle calls and dispatch resources, the area of focus is the categorisation of the severity of incidents. The process will vary depending on country, jurisdiction and legislation, but the typical processes are described as follows.

1. Receiving Emergency Calls:
   a. The process begins when an individual places an emergency call to the designated emergency number, such as 999 (United Kingdom), 911 (United States) and so on.
   b. The call is routed to a Public Safety Answering Point (PSAP), also known as an emergency call centre, based on the caller's location or the type of emergency service needed.
2. Call Triage and Call Handler Assignment:
   a. At the Public Safety Answering Point, the call is received by a call handler or dispatcher who assesses the nature of the emergency.
   b. Information gathering begins as the call handler asks a series of standardised questions and prompts to obtain important details about the situation. This may include the caller's location, the type of incident, and any injuries or hazards involved.
   c. The call handler categorises the call based on its perceived severity, which can range from life-threatening emergencies to non-urgent situations.
3. Location Identification:
   a. In parallel with call assessment, the call handler uses various tools and technologies to pinpoint the caller's location accurately. This may involve GPS data from the caller's mobile phone, location-based services, or information provided by the caller.
4. Dispatching Resources:
   a. Once the call is categorised, the call handler determines the appropriate response and resource allocation.
   b. Emergency services, including police, fire, or medical personnel, are dispatched to the incident location based on the information gathered and the severity of the situation.
   c. For complex incidents, multiple units and specialised teams may be dispatched to handle different aspects of the emergency.
5. Continuous Communication:
   a. Throughout the process, the call handler maintains communication with the caller to provide instructions, reassurance, and updates on the status of the response.
   b. The dispatcher coordinates and relays information between emergency responders, ensuring they have the necessary details to address the situation effectively.
6. Real-Time Updates and Monitoring:
   a. Emergency services use real-time tracking and mapping systems to monitor the location and status of responding units. This helps optimise response times and resource allocation.
   b. Dispatchers continuously assess the situation and may adjust resource deployment as needed based on changing circumstances.
7. Incident Resolution:
   a. Emergency responders arrive at the incident location and take appropriate actions to mitigate the emergency, provide medical care, ensure public safety, or address the crisis according to their training and protocols.
   b. The call handler or dispatcher remains in contact with responders, providing updates and guidance as necessary until the incident is resolved.
8. Post-Incident Documentation:
   a. After the incident is resolved, detailed documentation is created, including call records, incident reports, and any medical or legal documentation as required.
   b. This documentation is important for legal and administrative purposes and may be used for debriefing and continuous improvement.
9. Quality Assurance and Review:
   a. Many emergency services conduct quality assurance reviews to assess the handling of each emergency call. This process ensures adherence to protocols and identifies opportunities for training and improvement.

An example 100 of this current process of emergency call categorisation is shown in FIG. 1. In FIG. 1, a first call handler 102 first asks the caller what emergency services they require. Next, the caller 104 responds with the service they need (e.g. ambulance). Next, the call is redirected to a second call handler 106 who asks the caller a series of prompts 108 to obtain information about the emergency (e.g. "What is the emergency?", "Are they still breathing?"). The second call handler subjectively categorises the emergency based on the caller's responses and their past experience. If appropriate, emergency services 110 will be dispatched and the second call handler will inform the caller that emergency services have been dispatched and keep them on the line until emergency services arrive at the scene.

Embodiments of the present invention aim to address the issue of emergency call severity categorisation, amongst others (embodiments of the invention could be applied to any industry or sector, as described above). Emergency service dispatch centres contend with a substantial influx of calls, especially during major events, a circumstance that can cause bottlenecks and consequential delays in processing. Moreover, the decision of whether to dispatch resources or not is heavily contingent upon the dispatcher's individual experience and their inherently subjective judgment. This reliance on dispatcher subjectivity can introduce an element of ambiguity and potential for miscommunication, significantly heightening the probability of erroneous information shared.

As a direct consequence of this inherent subjectivity, incidents are frequently misclassified with regard to their severity. This misclassification, in turn, gives rise to two distinct and problematic scenarios: over-resourcing and under-resourcing. In the former, excessive resources may be allocated to a particular incident, leading to a depletion of available resources for other emergencies. Conversely, under-resourcing transpires when inadequately equipped or inappropriate resources are dispatched to handle a given situation, thus, rendering the emergency response inadequate which can have a direct implication of peoples' health and wellbeing.

Adding to these challenges is the caller's emotional state during the crisis. In many instances, callers experience shock and panic, rendering their initial assessment of incident severity susceptible to fluctuation during the course of the phone call. It is against this backdrop that the implementation of a robust and adaptive system capable of real-time severity categorisation is of paramount importance. Such a system possesses the potential to proactively mitigate the issues aforementioned by providing a dynamic assessment that adjusts to evolving circumstances, thus enhancing the precision and efficiency of emergency resource allocation and response.

Various aspects and details of these principal concepts will be described below by way of example only with reference to FIGS. 2 to 9.

Figure 8:
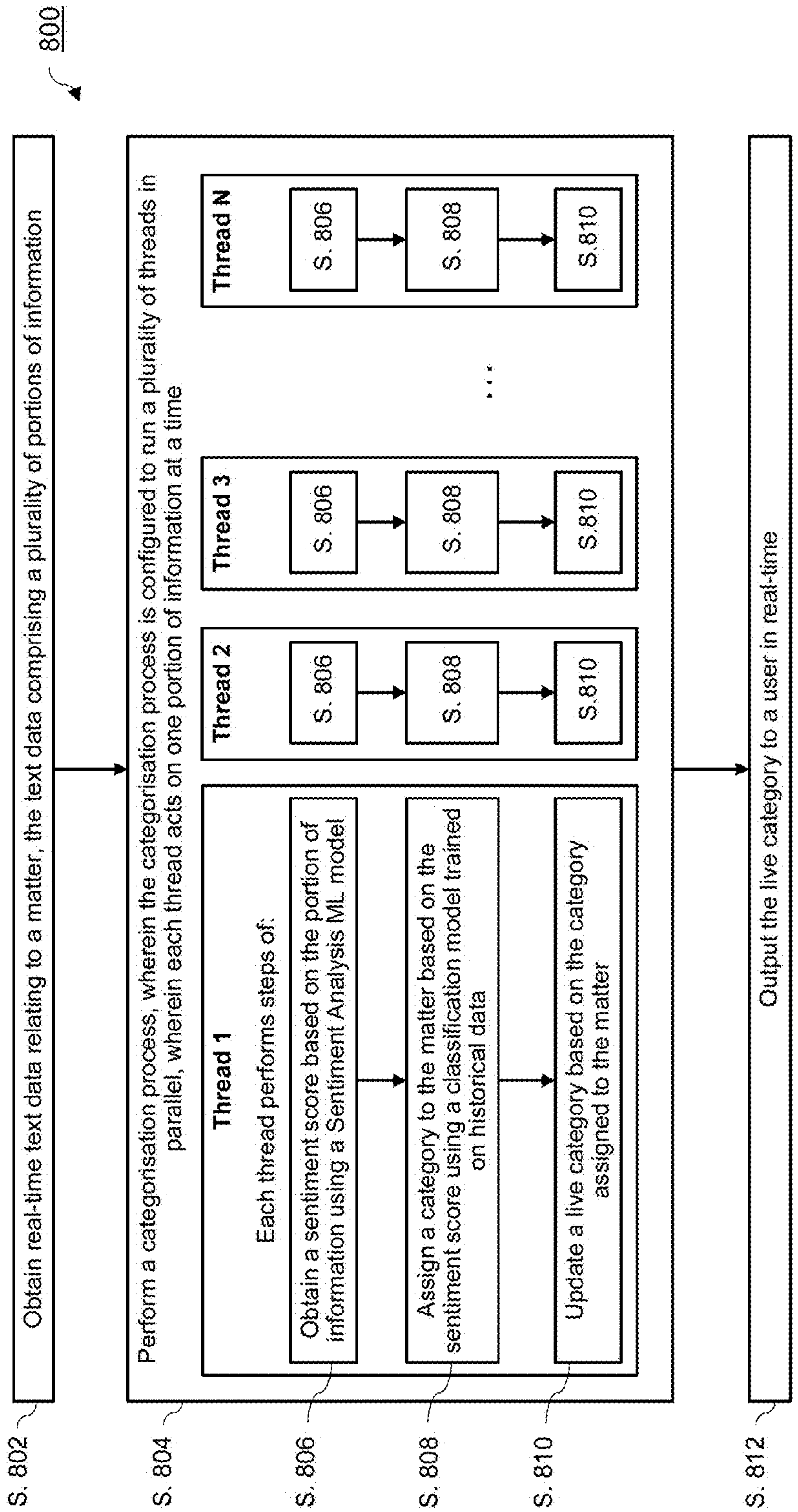
FIG. 8 is a flow chart, in accordance with some embodiments of the invention.

FIG. 8 is a flow chart illustrating method steps in a computer-implemented method 800. The method comprises steps 802-812.

At step 802, real-time text data relating to a matter (e.g. an event, an incident, a problem, a query, an inquiry, an emergency incident) is obtained, the text data comprising a plurality of portions of information. In some examples, the real-time text data may be converted from real-time voice data, e.g. if the source of the text data is a phone conversation (e.g. an emergency call), the voice data can be converted to text data. In other examples, the source of the text data may be a text-based conversation from an online chat, text messages, email messages, etc. The plurality of portions of information may refer to individual messages within the conversation, e.g. responses to an operator.

At step 804, a categorisation process is performed. The categorisation process may be performed by the Parallel Event Categorisation (PEC) module described herein. Each conversation may have its own instance of the PEC module. The categorisation process is configured to run a plurality of threads (Threads 1, 2, 3 . . . . N) in parallel. Each thread acts on one portion of information (e.g. message) at a time. In other words, multiple messages can be analysed at once as multiple threads each take one message at a time. This means longer messages can be analysed by one thread, while other threads handle shorter messages. Longer messages take a longer time to analyse than shorter messages. The parallelisation speeds up the analysis so that the conversation can be analysed in real-time. This is especially important for live conversations such as phone calls or online chats.

At step 806, each thread obtains a sentiment score (or equivalently, a sentiment label) based on the portion of information (e.g. the message) using a sentiment analysis ML model. The Sentiment Analysis model may be an off-the-shelf sentiment analysis model. Similarly to the NER model, the Sentiment Analysis model may be location specific—e.g. UK-based, US-based, global, etc.

At step 808, each thread assigns a category (e.g. a severity category, an urgency category, a subject-matter category) to the matter based on the sentiment score using a classification model trained on historical data. The classification model may be trained on historical data by obtaining a historical database of historical data comprising a plurality of portions of text data each labelled with a category and training the classification model based on the historical database. For this purpose, the incoming real-time text data may be labelled with its assigned category and added to a historical database to train the classification model and/or the sentiment analysis model.

The classification model and/or the sentiment analysis model may be trained based on domain knowledge, i.e. a set of categories appropriate for the context. E.g. in emergency service applications, the classification model may be trained using both the historical text data and domain knowledge of incident categorisation standards from the emergency service, e.g. ISER for the police where I is immediate (high urgency), S is significant (low urgency), E is extended (non-urgent) and R is referred (attendance not required). In customer service applications, the classification model may be trained using both the historical text data and domain knowledge categorisation standards within the corporation.

At step 810, each thread updates a live category based on the category assigned to the matter. In other words, there is a live category variable which is updated based on the categories assigned by the threads. As each thread finishes analysing a message, the live category is updated with the latest analysis. As such, it is always the most up-to-date category which is output to the user in step 812. The output may be displayed to the user via a GUI.

Optionally, prior to step 806, each thread may additionally perform a step of obtaining one or more keywords from the portion of information using a Name Entity Recognition, NER, ML model. The NER ML model may be an off-the-shelf NER model. The NER ML model may be location specific—e.g. UK-based, US-based, global, etc. The NER model may be trained on inhouse data, for example, the NER model may be trained on police force data if being used in that context. These keywords may then be used as inputs into the Sentiment Analysis ML model and/or the classification ML model. Similarly to the live category variable explained above, the keywords may be used to update a live keyword output and the method may further comprise outputting the live keyword output to the user in real-time via the GUI. For example, the keywords can be used to highlight important information in the transcript window as described below.

It should be noted that embodiments of the invention are described below in the context of emergency service calls. However, the invention is not limited to this application, and the skilled person would appreciate that embodiments of the invention may equally be used for any industry or sector which benefits from categorising a matter based on incoming text data in real-time.

For example, referring to embodiments of the invention, the real-time text data may comprise data from calls/messages from a customer who needs urgent help. The matter in this instance may be a problem. The plurality of portions of information may be each message from the customer. The categorisation may relate to levels of urgency and/or the topic of the problem. The historical data used to train the classification model may relate to historical customer queries labelled with their categorisation.

In another example, the real-time text data may comprise data from emergency calls/messages from a caller who needs urgent help from emergency services (e.g. Ambulance, Fire, Police, Coastguard, Armed Forces, etc.). The matter in this instance may be an emergency event/situation. The plurality of portions of information may be each response from the caller to the operator's prompts. The categorisation may relate to the severity of the situation. The categorisation may be in line with a categorisation standard, e.g. the police standard is ISER where I is immediate (high urgency), S is significant (low urgency), E is extended (non-urgent) and R is referred (attendance not required). The historical data used to train the classification model may relate to historical text data relating to emergency service calls, labelled with their categorisation.

In another example, the real-time text data may comprise data from calls/messages from a caller who needs healthcare assistance. The matter in this instance may be an inquiry. The plurality of portions of information may be each response from the caller to the operator's prompts. The categorisation may relate to urgency and/or medical condition, for example. The categorisation may be in line with a categorisation standard for that healthcare establishment. The historical data used to train the classification model may relate to historical text data relating to healthcare inquiries, labelled with their categorisation.

In another example, the real-time text data may comprise data from calls/messages from a person who needs tech support. The matter in this instance may be a tech issue. The plurality of portions of information may be each message from the person to a Helpdesk system. The categorisation may relate to urgency and/or topic, for example. The categorisation may be in line with a categorisation standard for that Helpdesk system. The historical data used to train the classification model may relate to historical text data relating to tech issues, labelled with their categorisation.

The optional NER ML model may take (portions of) the real-time text data as its input and output keywords from the text data.

The Sentiment Analysis ML model may take (portions of) the real-time text data and optionally, the keywords from the NER model, as its inputs and output the sentiment score (or sentiment label).

The classification ML model may take the sentiment score (from the Sentiment Analysis model) and optionally, the keywords (from the NER model), as its inputs and outputs the category.

Together, the Sentiment Analysis model and the Classification model (and optionally the NER ML model) form a thread. A plurality of threads form the Parallel Event Categorisation (PEC) module which performs the categorisation process. The parallel threads allow for multiple parts of a conversation to be analysed at once, resulting in a faster categorisation which can be updated in real-time as the conversation continues.

In some examples, the real-time text data originates as real-time voice data (e.g. from a call, e.g. an emergency call). The real-time voice data is converted to real-time text data using a voice to text converter.

In some examples, the category of the matter is output to a user in real-time via a GUI, for example, the GUI shown in FIGS. 3 and 4 and described below.

Figure 2:
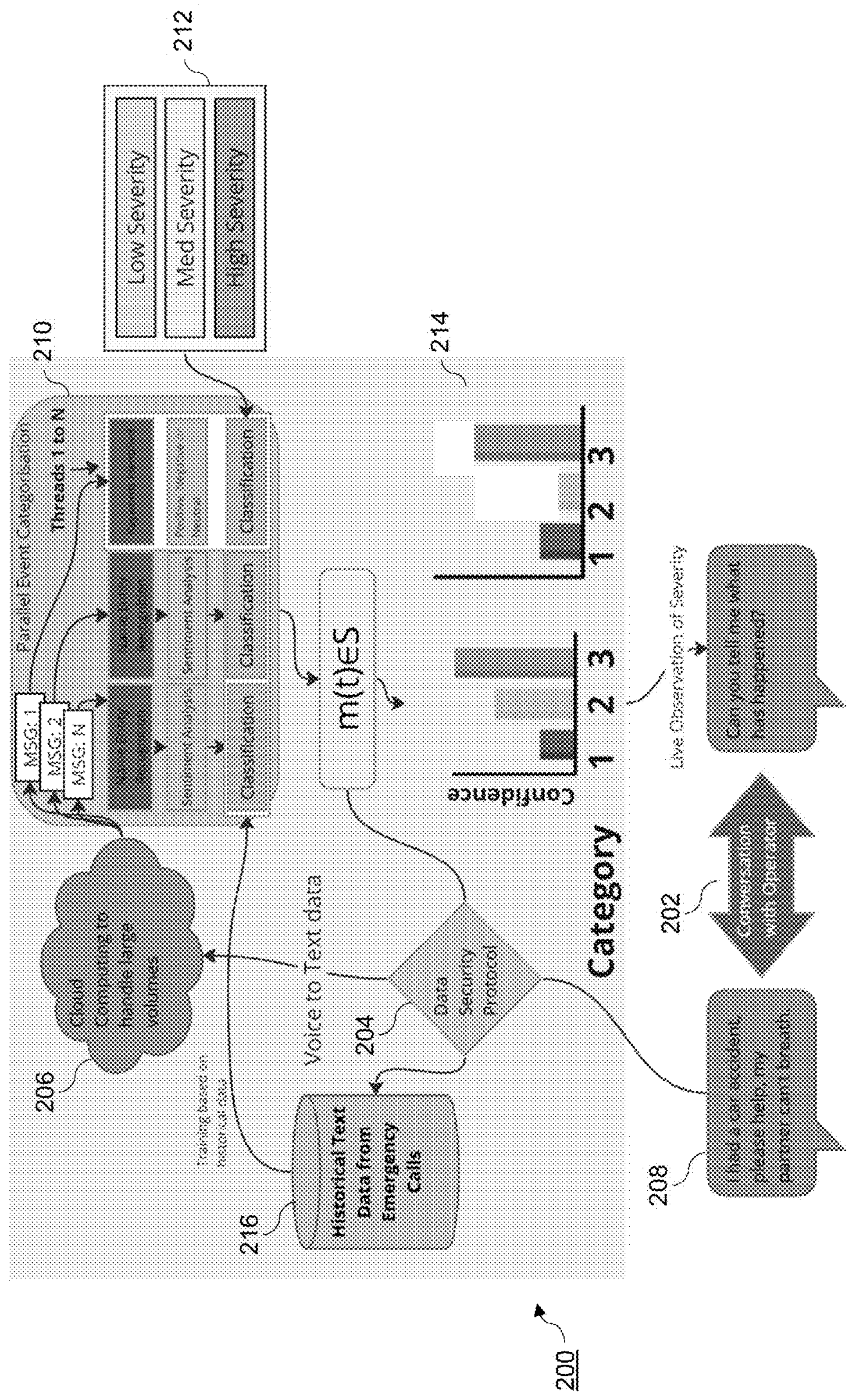
FIG. 2 illustrates an example of Real-Time Automated Dynamic Event Categorisation Framework using Parallel Language Processing, in accordance with some embodiments of the invention.

FIG. 2 illustrates concepts in accordance with embodiments of the present invention in the context of the example application of emergency service calls. FIG. 2 provides a detailed workflow of how emergency calls are handled using embodiments of the present invention. Referring to FIG. 2:

- The process begins with an incoming emergency call received at the appropriate emergency service call centre. The operator at the call centre initiates the conversation 202 by using common prompts to gather important information. These prompts aim to understand the nature of the emergency, the caller's location, and the type of incident being reported.
- At the next juncture, each response provided by the caller is channelled through a robust data security protocol 204. This protocol serves the important purpose of tagging the data for identification and security purposes. It acts as a safeguard, ensuring the integrity and privacy of the information shared during the conversation 202.
- After passing through the data security protocol 204, the tagged data is transmitted into the cloud infrastructure 206. This cloud-based system 206 is designed to provide the necessary computational power, storage capacity, and flexibility required for real-time data processing and analysis for many calls at once (tagged messages are routed appropriately to the same parallel event categorisation instance).
- Within the cloud infrastructure 206, each message, e.g. MSG: 1, is directed to the Parallel Event Categorisation (PEC) Module instance 210. This module is a component of a system 200, it facilitates the concurrent processing of messages. Here, a parallel algorithm is employed, which simultaneously launches a multitude of N threads to classify each message concurrently. There is one PEC module instance per incoming call. The PEC module deals with the parallelisation of a stream of messages coming from the incoming call. This parallelization is important for analysing messages from incoming calls efficiently. Analysing the messages in parallel is advantageous as the messages (i.e. the text data) will vary in length, with shorter messages taking less time to analyse than longer messages. By having the parallelisation, the process is not held up by the analysis of long messages. While one thread of the PEC module analyses a longer message, other threads of the PEC module can handle multiple shorter messages.
- As the messages 208 are classified, the system 200 dynamically assigns categories 212 to each message in real-time. These categories 212 are fluid and change as new information is incoming from the caller's responses and the ongoing conversation 202. The evolving categories 212 are displayed 214 in real-time to the operator, ensuring that they are continually updated about the incident's severity as it unfolds. Here, m(t) represents the severity category at time t, and S represents the superset of all possible severity categories.
- Once the operator is confident in the identified severity, a decision is made regarding the dispatch of relevant resources. This decision may be informed not only by the real-time categorisation but also by historical incident data and the current conversation with the caller. Timely dispatch of appropriate resources is an important outcome of this system, optimizing emergency response.
- Following the resolution of the incident, the conversation data is subjected to another round of processing through the data security protocol 204. This processed data is then securely labelled and stored in a historical text database 216. This archival of data serves multiple purposes, including compliance with data retention regulations, potential future reference, training for ML models (e.g. the classification ML model) and analysis for continuous improvement of emergency response procedures.

Embodiments of the present invention employ a parallel language processing approach which may be used to significantly enhance the management of large volumes of emergency phone calls to emergency lines in real-time. Furthermore, it can alleviate the pressures on call handlers having to assess the situation's severity during the conversation with a distressed caller. The following are key points on how this technology can solve the problems already discussed previously:

- Language processing algorithms enable the extraction of important information from emergency calls by thoroughly analysing various components. This includes deciphering the caller's verbal description, voice recognition to translate voice to text, and semantic understanding to grasp the context. Through this sophisticated analysis and training on large swathes of previous conversation data, the system can accurately categorize incoming calls based on their urgency and severity in real-time. This not only expedites the response process but also ensures that each call receives the appropriate level of attention.
- By leveraging cloud computing technology, the system gains substantial scalability and flexibility. Emergency services often contend with sudden spikes in call volumes, especially during crises. Cloud-based infrastructure provides the necessary computational power and storage capacity to process and analyse these incoming calls in real-time. This means that the system can seamlessly adapt to fluctuations in demand, ensuring a consistently efficient response, even during high-call-volume scenarios.

Recognizing that the pace at which callers convey their issues can vary significantly, the incorporation of parallel computing becomes important. By parallelizing the event-categorisation module, the system can process multiple messages simultaneously for the same call rather than processing one message at a time and updating the classification metric. This parallelization optimizes the allocation of resources, allowing for quicker handling of calls in an automated way. As a result, it alleviates the strain on operators, reduces response times, and expedites the delivery of emergency services. This is particularly important in situations where every second counts.

The integrity and security of caller information are paramount. Robust security measures, including state-of-the-art encryption techniques, stringent access controls, and secure data storage protocols, are important components for handling sensitive data. These measures not only safeguard sensitive caller information from unauthorized access but also ensure strict compliance with stringent data privacy regulations. The trust and confidentiality of the caller are preserved throughout the emergency call handling process, instilling confidence in both callers and emergency service providers.

The following is a detailed description of each stage of FIG. 2 which illustrates embodiments of the invention in the exemplary context of emergency calls:

Step 1. Emergency Operator transfers incoming call to the requested service operator (Police, Ambulance or Fire).

Step 2. The service operator initiates the prompt "what is your emergency?" and the caller starts to describe the problem.

Step 3. The incoming responses are converted from Voice-to-Text.

Step 4. The converted responses are sent to a DSP (Data Security Protocol) module where the following steps occur:

a. The converted responses are tagged a call_ID which is a unique 12-character identifier e.g. 172937194827 and the message_number which is the order in which the responses come into the system, the first will be 1.

b. The tagged response response (172937194827, 1, RESP_MSG) enters a entity recognition module where personal information such as names are anonymized. Note RESP_MSG is the raw text response from the caller.

c. There are now two response messages: response (172937194827, 1, RESP_MSG) and response_anonymised (172937194827, 1, RESP_MSG_ANON). Response_anonymised is sent to the Historical Text Database for record and response is sent to the cloud computing infrastructure. Where RESP_MSG_ANON is the anonymized version of the caller response.

Step 5. The response_anonymised text data is used as record keeping in the Historical Text Database (unlabelled). While the response tagged message is sent to the cloud infrastructure which conducts the following steps:

a. The response (172937194827, 1, RESP_MSG) enters the real-time message ingestion module which stores the message awaiting the next process.

b. The cloud infrastructure can handle a large number of incoming response (call_ID, message_number, message) variables and is able to submit these responses in parallel to an Event Categorisation instance.

Step 6. The Parallel Event Categorisation framework parallelizes the incoming responses and conducts the following processes:

a. The RESP_MSG is extracted from the response variable and used as input into a trained Name Entity Recognition (001) process which highlights the keywords such as places, names, type of emergency, etc. for each parallel thread. The RESP_MSG could then look like: "WE HAD A CAR ACCIDENT, MY HUSBAND MARC IS NOT BREATHING, WE ARE IN WINDSOR" These keywords are then compiled into a data structure x={[172937194827, 1]: [CAR, MARC, NOT BREATHING, WINDSOR], . . . , [172937194827, N]: [, . . . ,]}, new incoming messages are appended to x, messages are appended in parallel.

b. Each RESP_MSG, in this case="WE HAD A CAR ACCIDENT, MY HUSBAND MARC IS NOT BREATHING, WE ARE IN WINDSOR" . . . is used as input to a Sentiment Analysis instance (002) which tags a sentiment to the message, in this case, the message would be y=Negative (since the content of the message has a negative sentiment-their husband is not breathing after a car accident) and the algorithm may be trained prior using both domain knowledge from the emergency service and past historical labelled data.

c. The last step involves a classification process (003) which may have been trained using both the Historical Text Data and Domain Knowledge of incident categorisation standards from the emergency service e.g. in the police its I,S,E,R where I is immediate (high urgency), S is significant (low urgency), E is extended (non-urgent) and R is referred (attendance not required). The inputs for the classification module would be x, y and response→X=(x, y, response) for each thread. The output from the module would be: (timestamp, category, confidence, call_ID) which will then be fed into the visualization dashboard (004) so the dispatcher can see how the Automated Dynamic Event Categorisation (ADEC) framework categorizes the call in real-time and this categorisation process can change as the conversation continues, given that people can subjectively perceive an incident in different ways, sometimes a call may sound like a category 1 high urgency event but actually as the conversation continues, might not be.

Step 7. Once the call is handled, the compiled data is labelled with the severity and sent through the data security protocol and to the historical database for training tasks.

Figure 3:
FIG. 3 illustrates an example concept interface of the visualisation dashboard the operator observes (unfilled), in accordance with some embodiments of the invention.
Figure 4:
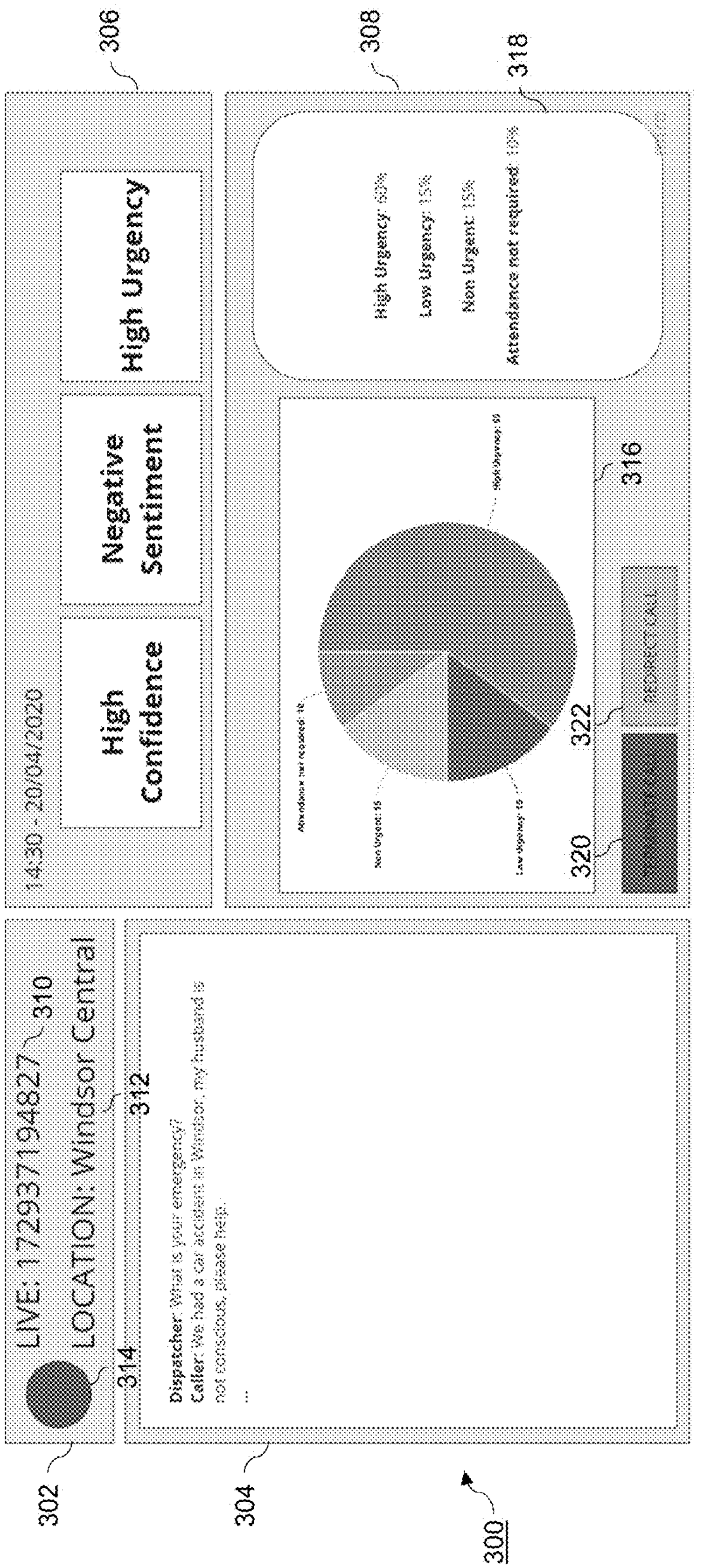
FIG. 4 illustrates an example concept interface of the visualisation dashboard the operator observes (filled), in accordance with some embodiments of the invention.

The dashboard 300 shown in FIG. 3 shows an example GUI and describes example windows that an operator may observe during the handling of an emergency call. There are four sections, the live window 302, transcript window 304, raw analytical results window 306 and live categorisation window 308. The live window 302 highlights the 12-character identifier 310 and the location 312 in which the call is coming from. When the circle 314 is red, it means the operator is busy with a call. The transcript window 304 displays the live voice to text of the conversation ongoing with the operator and caller. The raw analytical results window 306 will show an aggregated result for the confidence (confidence metric based on the conversation and trained model), the sentiment and the urgency based on severity score. The live categorisation window 308 displays a pie-chart 316 or any other easy to read visualization that displays the severity score for the ongoing call in real-time. On the right, there is a quantitative description 318 of this severity score. The operator also has the ability to terminate a call with a "terminate call" button 320 or redirect it to another operator with a "redirect call" button 322, if the call is redirected, the accumulated information at the time is distributed to another operator. In FIG. 4, the visualization dashboard is filled with mock data (like reference numerals have been used).

Figure 5:
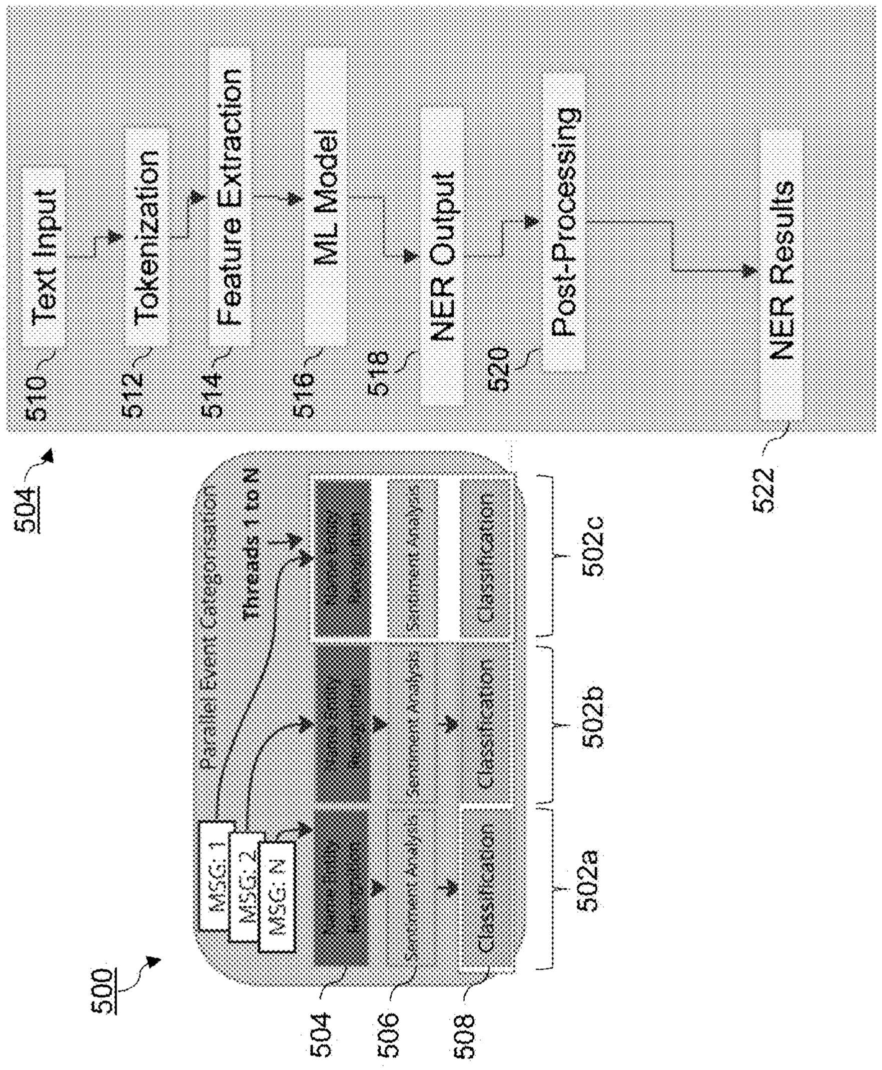
FIG. 5 illustrates an example of the Name Entity Recognition (NER) component within the Parallel Event Categorisation (PEC) module, in accordance with some embodiments of the invention.
Figure 6:
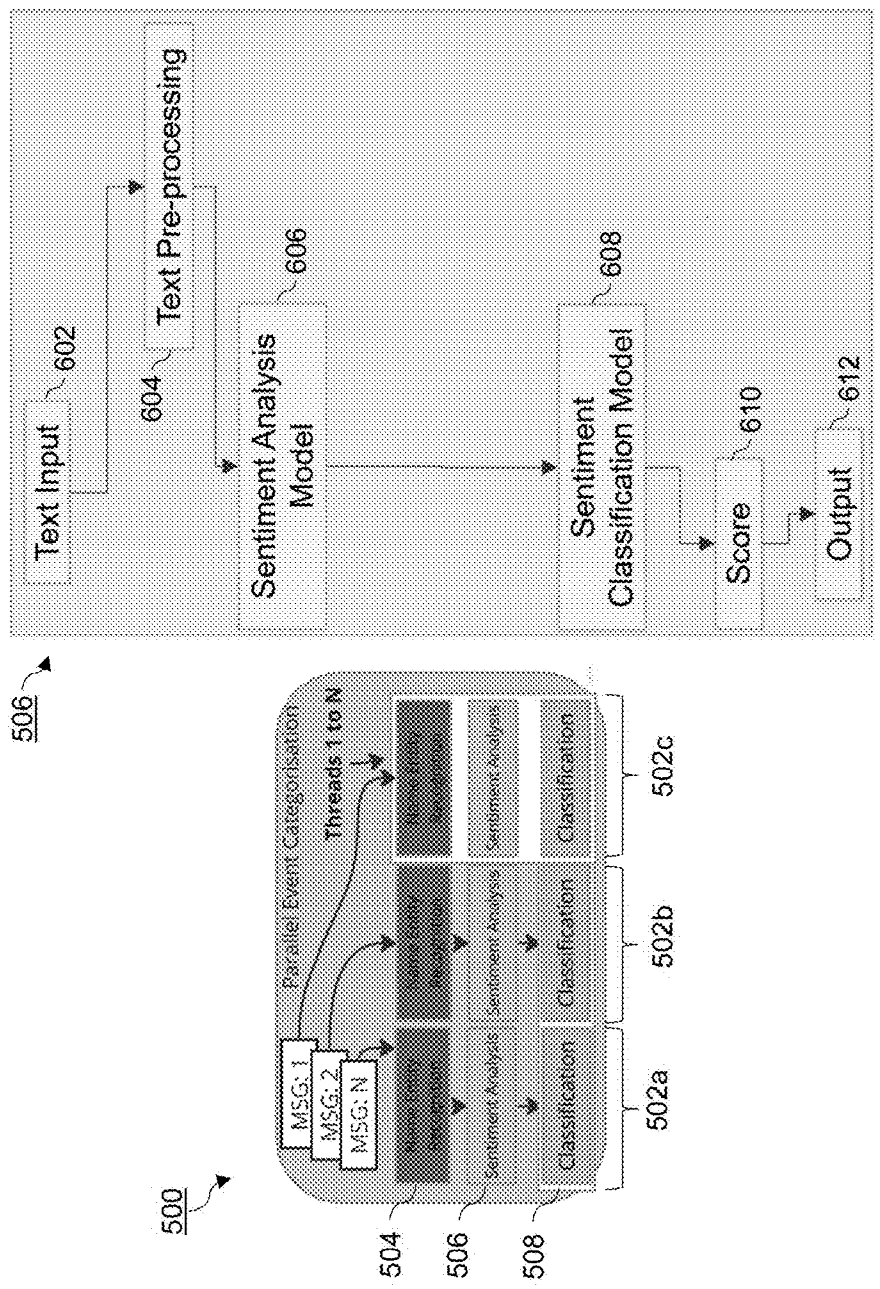
FIG. 6 illustrates an example of the Sentiment Analysis component within the PEC module, in accordance with some embodiments of the invention.
Figure 7:
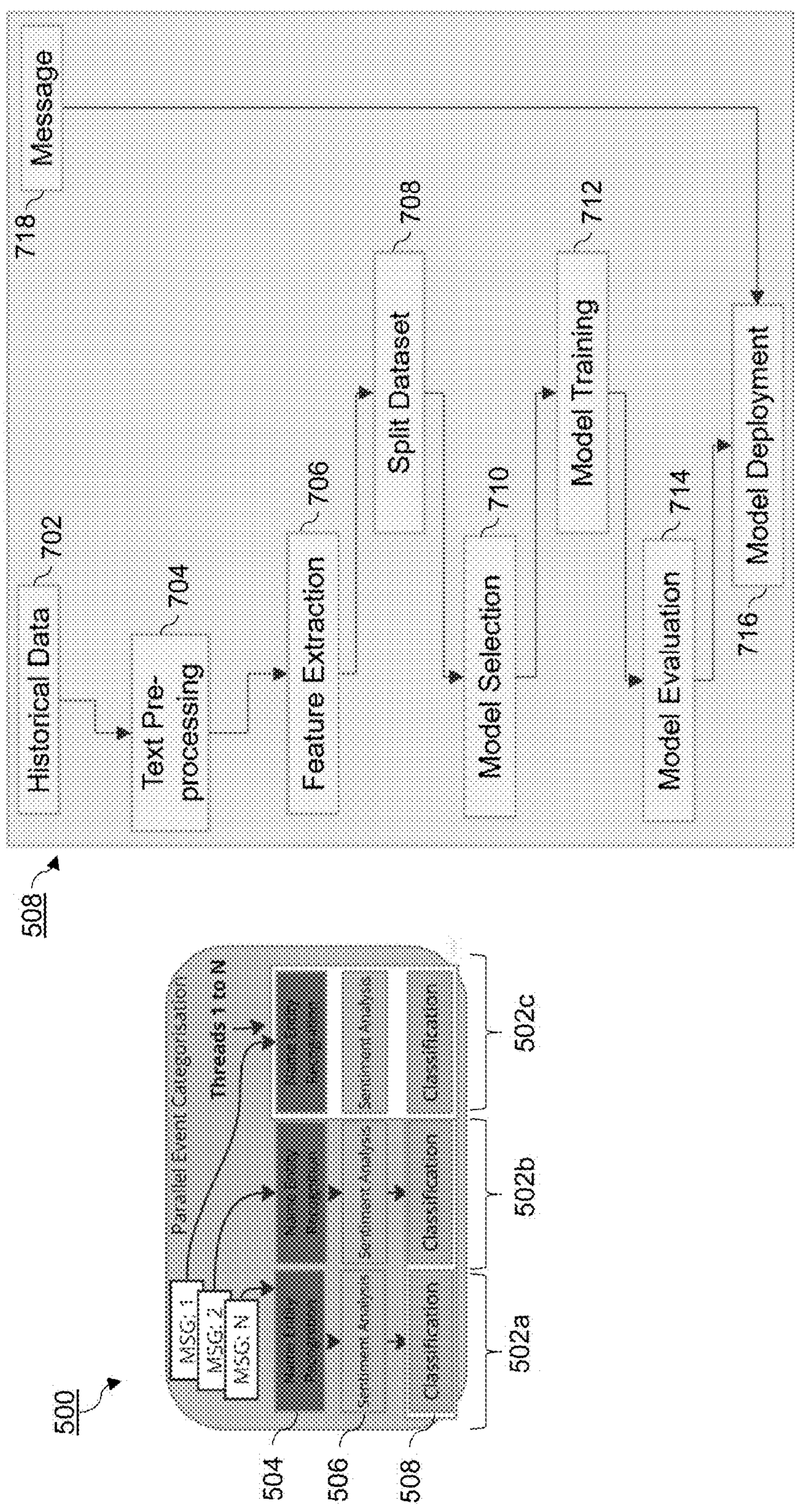
FIG. 7 illustrates an example of the classification component within the PEC module, in accordance with some embodiments of the invention.

The Parallel Event Categorisation (PEC) module 500 is shown in FIGS. 5-7 and executes step 6 as described above. The PEC module comprises N parallel threads e.g. 502*a*, 502*b*, 502*c*. For each parallel thread, where N is the number of threads and X is the number of messages currently in the module, we have N=X. Each parallel thread e.g. 502*a*, 502*b*, 502*c* comprises a sentiment analysis component 506 and a classification component 508 (and optionally a name entity recognition (NER) component 504), as described below.

The optional NER component 504 undergoes several stages of data wrangling, analysis and results extraction. Each stage is described in FIG. 5 on the right. Some of these components are interchangeable and may be removed or swapped for other methods depending on the domain in which it is utilised. The optional use of the NER component 504 is described in relation to Step 6a above. In more detail, referring to FIG. 5, the first stage of the entity recognition component is receiving/obtaining a text input 510 (e.g. the RESP_MSG described above). Next, at the tokenization stage 512, the text input is broken down into smaller token units. Next, at the feature extraction stage 514, relevant features are extracted from each token. Next, at the ML model stage 516, a ML model which has been trained on annotated data such as people's names and locations is used on the extracted features. Next, the output of the ML model is the "NER output" 518 where each corresponding token is labelled e.g. B-PERSON, I-PERSON (e.g. beginning and end of a person's name) to keep track of who is saying what in the conversation, and in what order the tokens were said. For example, a first token could be labelled as being said by the operator and the next token could be labelled as being said by the caller. Next, there is a post-processing stage 520 where consecutive tokens with the same entity label (e.g. location) are merged to form complete named entities. For example, if "New" and "York" are tagged as [B-LOC, I-LOC], it is merged into a single entity "New York". The final output of the NER process ("NER Results") 522 is a list of identified named entities (keywords) along with their respective categories (e.g. [CAR, MARC, NOT BREATHING, WINDSOR] as in the example of Step 6a described above). Within each thread, the output of the NER process 504 (one or more keywords) may be used to update a live keyword output, which is then output to the user in real-time via a GUI (e.g., the GUI shown in FIGS. 3 and 4. For example, the live keyword output may be used to highlight key words in the Transcript Window 304.

Once the NER process 504 is complete, the results may optionally then be transferred into the sentiment processing phase 506 (FIG. 6). The sentiment processing phase 506 does not necessarily require the NER results, it may take the text data as its only input. However, inputting the NER result into the sentiment analysis component 506 may achieve a more accurate result. Each stage of the sentiment processing phase is described in FIG. 6 on the right. The use of the sentiment analysis component 506 is described in relation to Step 6b above. In more detail, referring to FIG. 6, the first stage of the sentiment analysis component 506 is receiving/obtaining a text input 602 which includes the original message text, e.g. the RESP_MSG described above and optionally includes the output from the NER component 504. Next, the text input is pre-processed 604. The pre-processing phase may comprise a tokenization process, converting the text to lower-case and/or punctuation removal. Next, a sentiment analysis model 606 acts on the pre-processed text. The sentiment analysis model 606 is a machine learning algorithm which has been trained on labelled data (corpus with sentiment labels) from historical phone conversations. Suitable machine learning algorithms include: Support Vector Machines (SVM), Naïve Bayes, Recurrent Neural Networks (RNNs), and Transformers (e.g. BERT). The model learns to recognise sentiment patterns and make predictions such that the model learns to identify the correct sentiments given the new inputs from real-time conversations. Next, the sentiment is classified by a sentiment classification model which outputs a classification determining if sentiment is positive, negative or neutral. Next, a sentiment score is assigned, indicating the strength of the sentiment expressed, this will in-turn impact the severity outputs. The sentiment score may be a normalised value between −1 and +1 with −1 representing a most negative sentiment (e.g. very agitated, very panicked), 0 representing a neutral sentiment, and +1 representing a most positive sentiment (e.g. harmonious conversation). Similarly, the sentiment score may be a normalised value between 0 and 1 with 0 being most negative and 1 being most positive. The output of the sentiment analysis component is an output which may comprise a sentiment label (positive, negative or neutral) and/or the sentiment score. The sentiment score and the sentiment label can be easily converted between each other—the sentiment score is a numerical form of the sentiment label. The sentiment analysis may help inform the model how quickly to take action. For example, if the caller is highly panicked and thus has a very negative sentiment score, the model may suggest to the user to take action (e.g. dispatching emergency services) faster (thus basing the classification on less information as the conversation will be shorter) than if the caller was calm and had a more positive sentiment score. The main purpose of the sentiment analysis is to differentiate between a highly negative scenario compared to a positive one (although, in the application of the system to emergency service calls, there is unlikely to be any positive calls). If the majority of messages from an incoming call are of negative sentiment, then this impacts the classification score i.e., this call is likely to be classified as highly urgent given that the majority of messages were labelled a negative sentiment.

The classification component 508 is shown in FIG. 7. The training of the classification component 508 will first be described, referring to FIG. 7. The first stage of training the classification component is receiving/obtaining historical data 702. The classification component is initially trained using the latest version of the historical database 702 of conversations that have been labelled with their severity metric (Step 7 described above). The historical data 702 from emergency calls is parsed. The text from the historical data 702 is then pre-processed 704 to clean and prepare the text data so it is suitable for analysis. The text data then undergoes feature extraction 706 to convert the data into numerical features so that the machine learning algorithm can work with the data. Then, the dataset is divided 708 into training, validation and test sets. A machine learning model is then chosen 710 (e.g. a naïve bayes model, a logistic regression model, etc.) and trained 712. The model's performance is then assessed/evaluated 714 on the test set using evaluation metrics (e.g. route mean squared error, Pearson's correlation coefficient, T-test, etc.). The trained model is then deployed 716.

The use of the classification component 508 is described in relation to Step 6c above. As described in Step 6c above, the classification module 508 takes the outputs of the sentiment analysis component (and optionally the output of the NER component), referred to in FIG. 7 as "Message" 718, as its input, and outputs a severity category for emergency call data received at that time. Note that some of these internal components can be swapped for other processes or algorithms, in some cases not all components will be needed and in others, all processes will be needed. New emergency call messages are then fed into the trained model as they are received and are classified instantly into a severity level in real-time. These results are then used to update the visualization dashboard, an example of which is shown in FIG. 4.

Worked Example: The Following Scenario May be Performed in the UK and Enacted by the Metropolitan Police Force The steps below correspond to the steps already described above in relation to FIG. 2.

Step 1: Emergency Operator Transfer
- The emergency operator receives a call and identifies it as a request for police service.
- The call is transferred to the Police Service Operator.

Step 2: Prompt for Emergency Details
- The Police Service Operator initiates the prompt, "What is your emergency?"
- The caller starts describing the problem, "I witnessed a robbery in progress near Oxford Street."

Step 3: Voice-to-Text Conversion
- The caller's spoken response, "I witnessed a robbery in progress near Oxford Street," is converted from voice to text.

Step 4: Data Security Protocol Module
- The converted response is tagged with a unique call_ID (e.g., 172937194827) and a message_number (1).
- The tagged response enters an entity recognition module for anonymization.
- Two responses are generated:
  - 'response (172937194827, 1, "I witnessed a robbery in progress near Oxford Street")'
  - 'response_anonymised (172937194827, 1, "I witnessed a robbery in progress near [LOCATION]"), where [LOCATION] is anonymized'.

Step 5: Data Handling
- 'response_anonymised' is sent to the Historical Text Database for record-keeping.
- 'response' is sent to the cloud computing infrastructure.

Step 6: Parallel Event Categorisation Framework
- The cloud infrastructure handles incoming responses and parallelizes the categorisation process.
- For each parallel thread:
  - The RESP_MSG, in this case, is "I witnessed a robbery in progress near Oxford Street."
  - The Name Entity Recognition (001) highlights keywords: [LOCATION: Oxford Street], [INCIDENT TYPE: robbery], [WITNESS].
  - Sentiment Analysis (002) tags the sentiment: 'Negative'.
  - Classification (003) categorizes the incident as 'I (Immediate)' based on domain knowledge and historical data.

Step 7: Visualization and Final Data Handling
- The categorisation output for the thread is '(timestamp, category, confidence, call_ID)' where 'category' is 'I', 'confidence' is a numerical value indicating certainty of output given the input data, and call_ID' is 172937194827
- This data is fed into the visualization dashboard (004) for the dispatcher to monitor in real-time.
- The categorisation may change as the conversation continues.
- Once the call is handled, the compiled data is labelled with the severity (I in this case) and sent through the data security protocol to the historical database for training tasks.

This process ensures that emergency calls are efficiently categorized and that dispatcher decisions are based on real-time analysis of the caller's information. The system can adapt as the conversation progresses, providing more accurate categorisation and response to the emergency.

Hardware

Figure 9:
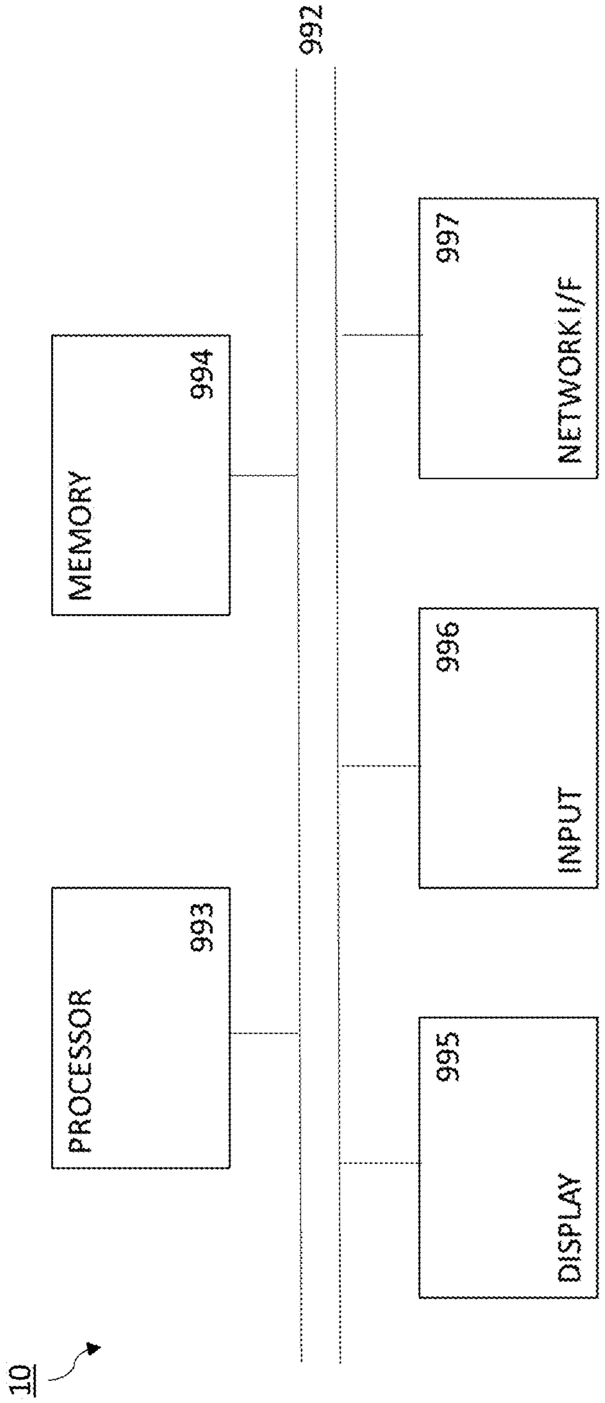
FIG. 9 illustrates an apparatus, in accordance with some embodiments of the invention.

FIG. 9 is a block diagram of an information processing apparatus 10 or a computing device 10, such as a data storage server, which embodies the present invention, and which may be used to implement some or all of the operations of a method embodying the present invention, and perform some or all of the tasks of apparatus of an embodiment. The computing device 10 may be used to implement any of the method steps described above, e.g. any of S. 802-812.

The computing device 10 comprises a processor 993 and memory 994. Optionally, the computing device also includes a network interface 997 for communication with other such computing devices, for example with other computing devices of invention embodiments. Optionally, the computing device also includes one or more input mechanisms such as keyboard and mouse 996, and a display unit such as one or more monitors 995. These elements may facilitate user interaction. The components are connectable to one another via a bus 992.

The memory 994 may include a computer readable medium, which term may refer to a single medium or multiple media (e.g., a centralized or distributed database and/or associated caches and servers) configured to carry computer-executable instructions. Computer-executable instructions may include, for example, instructions and data accessible by and causing a general purpose computer, special purpose computer, or special purpose processing device (e.g., one or more processors) to perform one or more functions or operations. For example, the computer-executable instructions may include those instructions for implementing a method disclosed herein, or any method steps disclosed herein, for example the method or any method steps illustrated in S. 802-812. Thus, the term "computer-readable storage medium" may also include any medium that is capable of storing, encoding or carrying a set of instructions for execution by the machine and that cause the machine to perform any one or more of the method steps of the present disclosure. The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor 993 is configured to control the computing device and execute processing operations, for example executing computer program code stored in the memory 994 to implement any of the method steps described herein. The memory 994 stores data being read and written by the processor 993 and may store historical data, real-time text data, keyword data, sentiment score data and/or category data described above and/or programs for executing any of the method steps S. 802-812. As referred to herein, a processor may include one or more general-purpose processing devices such as a microprocessor, central processing unit, or the like. The processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and operations discussed herein. The processor 993 may be considered to comprise any of the modules described above. Any operations described as being implemented by a module may be implemented as a method by a computer and e.g. by the processor 993.

The memory 994 and the processor 993 may be collectively configured to provide a Parallel Event Categorisation, PEC, module 500 arranged to perform the categorisation process, wherein the PEC module 500 comprises a plurality of threads and each thread comprises a Sentiment Analysis ML model 506, a classification ML model 508, and optionally an NER ML model 504.

The display unit 995 may display a representation of data stored by the computing device, such as the live categorisation or a recommendation and/or GUI windows as described above in relation to FIGS. 3 and 4 and/or interactive representations enabling a user to interact with the apparatus 10 as described above with reference to any of steps S. 802-812 by e.g. drag and drop or selection interaction, and/or any other output described above, and may also display a cursor and dialog boxes and screens enabling interaction between a user and the programs and data stored on the computing device. The input mechanisms 996 may enable a user to input data and instructions to the computing device, such as enabling a user to input any of the user input described above.

The network interface (network I/F) 997 may be connected to a network, such as the Internet, and is connectable to other such computing devices via the network. The network I/F 997 may control data input/output from/to other apparatus via the network.

Other peripheral devices such as microphone, speakers, printer, power supply unit, fan, case, scanner, trackerball etc may be included in the computing device.

Methods embodying the present invention may be carried out on a computing device/apparatus 10 such as that illustrated in FIG. 9. Such a computing device need not have every component illustrated in FIG. 9, and may be composed of a subset of those components.

For example, the apparatus 10 may comprise the processor 993 and the memory 994 connected to the processor 993. Or the apparatus 10 may comprise the processor 993, the memory 994 connected to the processor 993, and the display 995. A method embodying the present invention may be carried out by a single computing device in communication with one or more data storage servers via a network. The computing device may be a data storage itself storing at least a portion of the data.

A method embodying the present invention may be carried out by a plurality of computing devices operating in cooperation with one another. One or more of the plurality of computing devices may be a data storage server storing at least a portion of the data.

The invention may be implemented in digital electronic circuitry, or in computer hardware, firmware, software, or in combinations of them. The invention may be implemented as a computer program or computer program product, i.e., a computer program tangibly embodied in a non-transitory information carrier, e.g., in a machine-readable storage device, or in a propagated signal, for execution by, or to control the operation of, one or more hardware modules.

A computer program may be in the form of a stand-alone program, a computer program portion or more than one computer program and may be written in any form of programming language, including compiled or interpreted languages, and it may be deployed in any form, including as a stand-alone program or as a module, component, subroutine, or other unit suitable for use in a data processing environment. A computer program may be deployed to be executed on one module or on multiple modules at one site or distributed across multiple sites and interconnected by a communication network.

Method steps of the invention may be performed by one or more programmable processors executing a computer program to perform functions of the invention by operating on input data and generating output. Apparatus of the invention may be implemented as programmed hardware or as special purpose logic circuitry, including e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions coupled to one or more memory devices for storing instructions and data.

The above-described embodiments of the present invention may advantageously be used independently of any other of the embodiments or in any feasible combination with one or more others of the embodiments.

Various modifications whether by way of addition, deletion, or substitution of features may be made to above described embodiment to provide further embodiments, any and all of which are intended to be encompassed by the appended claims.

List of Numbered Statements

1. A computer-implemented method comprising:
obtaining real-time text data relating to a matter, the text data comprising a plurality of portions of information;
performing a categorisation process, wherein the categorisation process is configured to run a plurality of threads in parallel, wherein each thread of the plurality of threads acts on one portion of information at a time, wherein each thread performs the following steps:

obtaining a sentiment score based on the portion of information using a Sentiment Analysis machine learning, ML, model;

assigning a category to the matter based on the sentiment score using a classification ML model trained on historical data; and updating a live category based on the category assigned to the matter; and outputting the live category to a user in real-time.

2. The method of statement 1, wherein the method further comprises receiving real-time voice data relating to the matter and converting the real-time voice data to real-time text data.

3. The method of statement 1 or 2, wherein the matter comprises an event, an incident, a problem, a query or an inquiry.

4. The method of statement 3, wherein the matter comprises an emergency incident.

5. The method of statement 4, wherein the real-time text data is derived from an emergency call.

6. The method of any of the preceding statements, wherein the assigned category is a severity category indicating how severe and/or urgent the matter is.

7. The method of any of the preceding statements, wherein outputting the live category to a user in real-time comprises displaying the live category to the user via a Graphical User Interface (GUI).

8. The method of any of the preceding statements, wherein each thread additionally performs a step of obtaining one or more keywords from the portion of information using a Name Entity Recognition, NER, ML model.

9. The method of statement 8, wherein the NER ML model takes the portion of information as its input and outputs the one or more keywords.

10. The method of statement 8 or 9, wherein the Sentiment Analysis ML model additionally bases the sentiment score on the one or more keywords.

11. The method of any of statements 8 to 10, wherein the classification ML model additionally bases the category on the one or more keywords.

12. The method of any of statements 8 to 11, wherein each thread additionally performs a step of updating a live keyword output based on the one or more keywords; and the method further comprises outputting the live keyword output to the user in real-time via a GUI.

13. The method of any of the preceding statements, wherein the classification ML model trained on historical data is trained by obtaining a historical database of historical data comprising a plurality of portions of text data each labelled with a category; and training the classification ML model based on the historical database.

14. The method of statement 13, wherein the method further comprising labelling the text data with its assigned category and adding it to the historical database for training purposes.

15. The method of any of the preceding statements, wherein the Sentiment Analysis ML model takes the portion of information (and optionally the one or more keywords) as its inputs and outputs the sentiment score.

16. The method of any of the preceding statements, wherein the classification ML model takes the sentiment score (and optionally one or more keywords) as its inputs and outputs the category.

17. A computer program which, when run on a computer, causes the computer to carry out the method of any of statements 1 to 16.

18. An information processing apparatus comprising a memory and a processor connected to the memory, wherein the processor is configured to perform the method of any of statements 1 to 16.

19. The information processing apparatus of statement 18, wherein the memory and the processor are collectively configured to provide a Parallel Event Categorisation, PEC, module arranged to perform the categorisation process, wherein the PEC module comprises the plurality of threads and each thread comprises the Sentiment Analysis ML model and the classification ML model (and optionally the NER ML model).

The invention claimed is:

1. A computer-implemented method comprising:

obtaining real-time text data relating to a matter, the text data comprising a plurality of portions of information;

performing a categorisation process, wherein the categorisation process is configured to run a plurality of threads in parallel, wherein each thread of the plurality of threads acts on one portion of information at a time, wherein each thread performs the following steps:

obtaining a sentiment score based on the portion of information using a Sentiment Analysis machine learning, ML, model;

assigning a category to the matter based on the sentiment score using a classification ML model trained on historical data; and updating a live category based on the category assigned to the matter; and outputting the live category to a user in real-time.

2. The computer-implemented method of claim 1, wherein the method further comprises receiving real-time voice data relating to the matter and converting the real-time voice data to the real-time text data.

3. The computer-implemented method of claim 1, wherein the matter comprises an event, an incident, a problem, a query or an inquiry.

4. The computer-implemented method of claim 3, wherein the matter comprises an emergency incident.

5. The computer-implemented method of claim 4, wherein the real-time text data is derived from an emergency call.

6. The computer-implemented method of claim 1, wherein the assigned category is a severity category indicating how severe and/or urgent the matter is.

7. The computer-implemented method of claim 1, wherein outputting the live category to a user in real-time comprises displaying the live category to the user via a Graphical User Interface, GUI.

8. The computer-implemented method of claim 1, wherein each thread additionally performs a step of obtaining one or more keywords from the portion of information using a Name Entity Recognition, NER, ML model.

9. The computer-implemented method of claim 8, wherein the NER ML model takes the portion of information as its input and outputs the one or more keywords.

10. The computer-implemented method of claim 8, wherein the Sentiment Analysis ML model additionally bases the sentiment score on the one or more keywords.

11. The computer-implemented method of claim 8, wherein the classification ML model additionally bases the category on the one or more keywords.

12. The computer-implemented method of claim 8, wherein each thread additionally performs a step of updating a live keyword output based on the one or more keywords; and the method further comprises outputting the live keyword output to the user in real-time via a Graphical User Interface, GUI.

13. The computer-implemented method of claim 1, wherein the classification ML model trained on historical data is trained by:

obtaining a historical database of historical data comprising a plurality of portions of text data each labelled with a category; and training the classification ML model based on the historical database.

14. The computer-implemented method of claim 13, the method further comprising labelling the text data with its assigned category and adding it to the historical database for training purposes.

15. The computer-implemented method of claim 1, wherein the Sentiment Analysis ML model takes the portion of information, and optionally the one or more keywords, as its inputs and outputs the sentiment score.

16. The computer-implemented method of claim 1, wherein the classification ML model takes the sentiment score, and optionally one or more keywords, as its inputs and outputs the category.

17. A non-transitory computer readable medium storing a computer program which, when run on a computer, causes the computer to carry out a method comprising:

obtaining real-time text data relating to a matter, the text data comprising a plurality of portions of information;

performing a categorisation process, wherein the categorisation process is configured to run a plurality of threads in parallel, wherein each thread of the plurality of threads acts on one portion of information at a time, wherein each thread performs the following steps:

obtaining a sentiment score based on the portion of information using a Sentiment Analysis machine learning, ML, model;

assigning a category to the matter based on the sentiment score using a classification ML model trained on historical data; and updating a live category based on the category assigned to the matter; and outputting the live category to a user in real-time.

18. An information processing apparatus comprising a memory and a processor connected to the memory, wherein the processor is configured to perform a method comprising:

obtaining real-time text data relating to a matter, the text data comprising a plurality of portions of information;

performing a categorisation process, wherein the categorisation process is configured to run a plurality of threads in parallel, wherein each thread of the plurality of threads acts on one portion of information at a time, wherein each thread performs the following steps:

obtaining a sentiment score based on the portion of information using a Sentiment Analysis machine learning, ML, model;

assigning a category to the matter based on the sentiment score using a classification ML model trained on historical data; and updating a live category based on the category assigned to the matter; and outputting the live category to a user in real-time.

19. The information processing apparatus of claim 18, wherein the memory and the processor are collectively configured to provide a Parallel Event Categorisation, PEC, module arranged to perform the categorisation process, wherein the PEC module comprises the plurality of threads and each thread comprises the Sentiment Analysis ML model and the classification ML model, and optionally the NER ML model.

* * * * *